July 17, 1962 V. K. CHARVAT 3,044,833
METHOD AND APPARATUS FOR MAKING A COMPOSITE BRUSHING TOOL
Filed Sept. 26, 1957
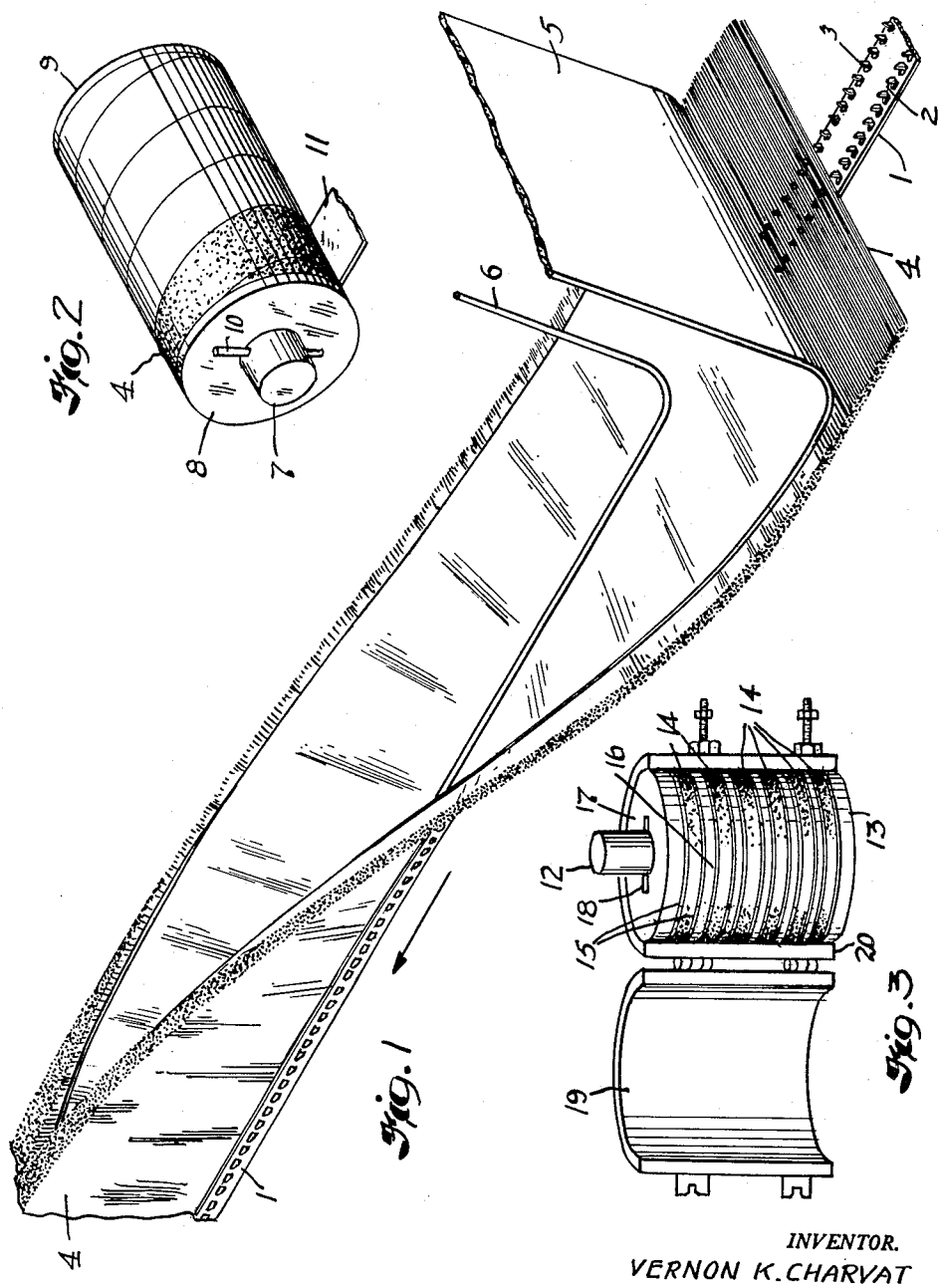
INVENTOR.
VERNON K. CHARVAT
BY
Oberlin Limbach
ATTORNEYS.

United States Patent Office 3,044,833
Patented July 17, 1962

3,044,833
METHOD AND APPARATUS FOR MAKING A COMPOSITE BRUSHING TOOL
Vernon K. Charvat, Bay Village, Ohio, assignor to The Osborn Manufacturing Company, Cleveland, Ohio, a corporation of Ohio
Filed Sept. 26, 1957, Ser. No. 686,500
11 Claims. (Cl. 300—21)

This invention relates as indicated to the manufacture of a composite brushing tool, and more particularly to a rotary brushing tool in which resiliently deformable plastic material is intruded between the brush bristles to modify the action of the latter and afford other advantages.

Reference may be had to the prior applications of Ruben O. Peterson, Serial No. 269,819, filed February 4, 1952, entitled "Brush," now Patent No. 2,826,776, and Serial No. 367,421, filed July 13, 1953, entitled "Brush Construction," for detailed descriptions of certain composite brushing tools of the type to which the present invention relates. This invention, however, is particularly concerned with improved methods of manufacturing such tools, both to facilitate and expedite such manufacture and also to produce tools of superior quality and uniformity. Broadly speaking, tools of the type in question ordinarily comprise some form of brush back, hub or support to which bristle material is secured in the usual manner. Intruded between such bristles and extending a major portion of their length is a body of resiliently deformable elastomeric plastic such as a sponge neoprene composition, for example, which is of a character to erode or crumble away in the region of the brush face when the brush is placed in use to ensure that relatively short outer end portions of the bristles protrude therefrom. The brush consequently has certain novel and highly advantageous characteristics.

When the resiliently deformable and friable plastic material is intruded between the bristles, which may for example be of steel wire, the latter may be substantially entirely submerged and enclosed by such plastic but when the tool, such as a cylindrical rotary tool with radially extending bristles, is brought into engagement with the work and rotated at high speed, the radially outer portion of such friable plastic will erode away to leave end portions of the wire bristles protruding therefrom, in some cases for about ¼ inch. These bristles are supported in a manner which greatly prolongs their life inasmuch as vibration is damped and concentrations of stress avoided. Furthermore, the larger portion of the bristle length will be protected from the action of corrosive materials and the like until gradually exposed as the tool wears back in use. As the face of the tool thus progressively wears back in use, the intruded plastic material will erode away at a comparable rate so that the length of the protruding bristle end portions will always remain approximately the same and the tool will retain to a much greater extent its initial operating characteristics than is the case with the usual power driven rotary brush.

The manufacture of tools of this type has proven rather difficult. The plastic materials suitable for the purpose are often rather messy to handle, and it has been a problem to intrude such plastic material between the bristles in a uniform manner and without undue compacting of the bristles in local regions. It is accordingly an object of the invention to provide a method of manufacturing various forms of composite brushing tools of the general type indicated in which the distribution of the brush bristles will be uniform.

Another object is to provide novel apparatus for molding such composite brushing tools which will be relatively inexpensive but efficient in use.

Still another object is to provide apparatus and a method of molding such tools suited for handling brushes of unusually large size.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a diagrammatic perspective view showing the manufacture of brush strip in a manner generally similar to that taught in Peterson Patent 2,303,386 but providing for incorporation of plastic material in a manner to facilitate subsequent intrusion of the same between the brush bristles;

FIG. 2 is a perspective view showing helically wound brush strip of the type which may be produced in accordance with the FIG. 1 method mounted and encased for performance of a blowing and curing operation properly to intrude the plastic material uniformly between the brush bristles; and FIG. 3 illustrates a method for producing a plurality of individual annular composite brushing tools in accordance with this invention.

Referring now more particularly to said drawing and especially FIG. 1 thereof, a continuous flat metal strip or band 1 is to be considered as traveling from right to left as viewed in the figure, such strip having two rows of teeth 2 and 3 punched up adjacent but slightly spaced from the respective edges of the strip. Such teeth extend normal to the surface of the strip and lie in planes transverse thereof. They will preferably be of a form shown and described in considerable detail in the aforesaid Peterson Patent 2,303,386. A layer of brush bristles 4 is deposited transversely of the strip as shown and a band of plastic material 5 which may, for example, desirably be of uncured neoprene containing a blowing agent so that it will become sponge neoprene when blown and cured is deposited upon such bristle layer. This band of plastic 5 will ordinarily be of slightly less width than the bristle length so that it will not quite extend to the ends of such bristles. An elongated retaining element such as wire 6 is placed upon plastic band 5 overlying the longitudinal center line of steel strip 1 and the latter is formed into an elongated channel of general U-shape cross-section by means of forming rolls (not shown) with the rows of teeth 2 and 3 penetrating between the bristles and through the plastic 5 to overlie wire 6 and secure the same in place. The continuous length of brush strip thus produced may be substantially identical to that of the aforesaid Patent 2,303,386 except for the double layer of plastic material enclosed in the midst of the folded bristle layer, and such brush strip may be wound upon a mandrel to form a helical brush of general cylindrical form of any desired length and diameter. Alternatively, it may be formed and cut into single turns to form annular brush sections with the opposed ends of the channelform brush back being welded or otherwise secured together and the opposed ends of the retaining wire 6 being similarly joined. Of course, the principles of this invention are also adapted for employment in conjunction with other known methods of brush manufacture and a layer of similar plastic material may likewise be incorporated in the annular rotary brush section shown in Whittle Patent 2,288,337, for example.

As shown in FIG. 2, a length of helically wound brush strip formed as above described may be mounted upon an appropriate mandrel 7 and clamped between removable discs or end plates 8 and 9 by means of locking pins such as 10. A properly shaped thin steel band 11 may then be wound closely about the exposed brush face and the assembly placed in an oven to blow and cure the elastomeric material. The strip 11 forming the helical sleeve enclosing the brush prevents uneven flow or escape of the elastic material during the heating and curing operation and at the same time affords sufficient venting to permit escape of excess gases and a small amount of flash. By thus wrapping such sleeve about the brush, displacement of the bristles is avoided, whereas forcing the brush axially within a cylindrical container for the same purpose would tend to deflect the bristles in one direction and such bristles would thereafter be held in such undesired orientation upon curing of the elastomeric material. The strip 11, on the contrary, by bearing against the bristle ends tends to hold the latter in their proper relative positions during performance of the blowing and curing operation so that the elastomeric material flows between the bristles in a substantially uniform manner without displacing or compacting the latter. Helically wound strip may be encircled and clamped in place temporarily by ordinary steel strapping. The ends of the strip will preferably taper as shown to lie flush with end members 8 and 9.

Now referring to FIG. 3 of the drawing, another embodiment of the invention is there illustrated showing an outer longitudinally split cylindrical shell which may be employed instead of the helically wound strip 11 and which is illustrated as employed in the manufacture of a plurality of individual annular composite brushing tools.

In this case, the mandrel 12 may be integrally co-axially joined to circular base plate 13 and a plurality of annular brush sections 14 may be stacked thereon. These annular brush sections may, for example, be of the type disclosed in the aforesaid Whittle patent but without any plastic material as yet included therein. Annular discs such as 15 of the uncured elastomeric material are placed on each side of each brush section and metal discs such as 16 are interposed between the adjacent elastomeric discs so that each brush section is in effect isolated in a compartment between two steel discs with a layer of the uncured elastic material pressed against each side of the layer of brush material. A heavy end disc 17 may be pressed down to compact the entire stack of brush sections to the desired degree and the locking pin 18 inserted to secure the same thus compacted.

The longitudinally split cylindrical shell comprising sections 19 and 20 is then fitted about the above-described assembly and clamped shut, whereupon it is placed in an oven to blow and cure the elastomeric material. The cylindrical shell permits the formation of only very little flash but does afford sufficient natural venting to release any otherwise dangerous pressures which may be generated during the curing and blowing stage. When the shell is unclamped and opened, the stack of metal discs and brush elements may then be disassembled, the elastomeric material having penetrated between the brush bristles in a uniform manner to form a brushing tool in which the bristles are substantially entirely hidden within the body of elastomeric material. When such latter material is of properly selected composition, however, as by inclusion of appropriate fillers, it will gradually erode away at the working face of the tool in use to expose short outer end portions of the bristles which then perform in the manner of a short trim brush, but with their action further regulated and controlled by the damping characteristics of the elastomeric body. The assembled stack of brush elements should desirably be inserted laterally into the FIG. 3 mold to avoid uneven displacement of the bristle ends.

As indicated above, the basic brush element employed may be of any of a variety of well-known types such as those disclosed in the prior Peterson Patents Nos. 2,303,386, 2,316,185, and 2,421,647, as well as in Whittle Patent No. 2,288,337 and Bickel et al. Patent No. 2,062,047. Brushes of these types have been modified by intruding a suitable elastomeric composition as described above between the strands or bristles of the brush material so that such bristles are resiliently held and spaced apart within the elastomeric body. Such brush material may be hard, low damping capacity steel wire and the intruded elastomeric composition may, for example, be neoprene having a certain amount of a filler such as bentonite incorporated therein together with the usual vulcanizing agents and the like. If desired, other abrasive powders may likewise be incorporated in such material, and it is often preferred to include a blowing agent of well-known type so that the final cured elastomer will be sponge-like as well as tending to erode away at its working face at a greater rate than the brush bristles themselves, in use.

By properly selecting the brush bristle material and the elastomeric body, a tool of this type may be provided in which the elastomeric body wears or crumbles away at a slightly more rapid rate than the hard wire or other brush material wears back in use. As the tool wears down in use, the elastomeric body continues to erode continuously progressively to expose short outer end portions (e.g. about ¼ inch in length) of the bristles so that there is no substantial alteration in the brushing face presented. This is, of course, very different from the case of the usual brushes where, as the bristles wear back in use, their brushing action becomes much modified and altered. When the preferred hard brush material is employed in a resilient plastic composition as taught herein, any fracture thereof due to impact or vibration will occur close to the working ends of the bristles which protrude slightly from the elastomeric body. This serves to keep such ends sharp without reducing the over-all diameter of the tool with undue rapidity. Such hard materials may desirably have a Knoop hardness of at least 600 and in some cases even of 800 or 900. When the latter extremely hard materials are employed, it becomes very important that the bristles protrude only very slightly from the elastomeric body.

A rotary brush revolves at such speeds that each strand is kept vibrating at all times from repeated contact with the work, whether such strands be of the high or low damping capacity type. Low damping capacity material is much less susceptible to self-destruction from this particular cause, however, since it does not do as much work fighting against vibration. Hard brushing materials are therefore desirable not only for their increased cutting capacity but also for the relatively low damping capacity which is generally associated therewith.

In accordance with this invention, brush bristle material may be employed having a Knoop hardness in excess of 600, and preferably in excess of 700 or even 800. Strands of materials such as the following are available having the requisite degree of hardness:

Hard steel wire (severe quench and a minimum draw back)
Glass fiber
Beryllium copper wire
Stainless steel wire
"Z" nickel wire (hard drawn, heat treated, relatively pure nickel)

The last two materials listed have somewhat greater damping capacity than the others. It is interesting to note that an ordinary brush employing stainless steel wire was observed to have about one-third the life expectancy of a brushing tool employing the same wire but manufactured in accordance with this invention. The resilient plastic takes over much of the damping function and literally saves the life of the brush material.

It should be appreciated that most wire, including steel wire, as well as most glass fiber commercially available has a degree of hardness substantially below Knoop 600. The techniques are, however, well known for the production of such wire and glass fiber having a hardness of the order specified.

The Knoop hardness of fine metal wire filaments, glass fibers and the like may be determined by means of apparatus known as the "Knoop indenter" which has been developed at the National Bureau of Standards and is now commercially available. The specification for Knoop indenters is set forth in detail in circular letter LC 819 of the National Bureau of Standards, United States Department of Commerce, dated April 1, 1946. The Knoop indenter is also described in U.S. Patent No. 2,091,995, and such indenter meeting the specifications of the National Bureau of Standards is manufactured and sold by Wilson Mechanical Instrument Company, Inc., an associate company of American Chain & Cable Company, Inc., 230 Park Avenue, New York 17, New York.

The relative hardness of different materials may be compared on a Knoop hardness scale in which the Knoop hardness number is expressed by the formula $$I = \frac{L}{Ap} = \frac{L}{l^2 Cp}$$

where $I$ = Knoop hardness number
$L$ = load (in kilograms) applied to indenter
$Ap$ = unrecovered projected area of indentation (in square mm.)
$l$ = measured length of long diagonal of the indentation (in mm.)
$Cp$ = constant relating $l$ to the projected area In making the Knoop hardness test, it is standard practice to make a number of measurements and to take the average of the results obtained inasmuch as the hardness of some materials tested (e.g. steel) is not entirely uniform throughout. When materials such as steel wire used for brush bristle material are selected of increasing Knoop hardness, they become more and more brittle and susceptible to fracture whereas, as materials of lower Knoop hardness are selected, they become increasingly tough.

The degree of hardness obtainable will, of course, vary with the material employed. Thus, glass fiber is available which is considerably harder than most harder grades of steel wire, and the latter may be had harder than stainless steel, for example. It is a general characteristic, however, that as hardness increases so does brittleness and notch sensitivity and the more important becomes the provision of resilient, high damping capacity material in association therewith. With the modified construction shown and described herein, stranded brush materials having a Knoop hardness in the 800 to 900 range have been employed with very great success.

In the case of steel wire, wire having a tensile strength of at least 300,000 p.s.i. attained by tempering (rather than by drawing) will ordinarily be in the upper range of Knoop hardness (and scratch hardness) which places it in the category of especially hard materials which may now be employed with superior results.

*The Plastic*

The plastics employed should ordinarily be able to withstand reasonably high operating temperatures without softening or smearing the work. Examples include:

Rubber (if operating temperatures not too high)
Neoprene (polychloroprene)
Hycar (modified copolymers of butadiene and acrylonitrile)
Nylon (polyamide resins)
Vinyl plastics (vinyl polymers and copolymers)
Melamine resins (melamine-formaldehyde reaction products)

It will be understood that in employing such plastics the same will ordinarily have included therewith suitable fillers as well as the usual vulcanizing agents or the like to produce the resilient plastic composition for the purpose of this invention.

The brush bristles will, of course, reinforce the plastic matrix to some extent and in all cases the plastic material must be strong enough to resist the outward pull of centrifugal force at operating speeds and should not break out in large pieces. It will be sufficiently resilient to prevent permanent deformation in use and should have a relatively high damping capacity. It is furthermore generally desirable that the plastic material be able to withstand a certain amount of contact with oil and grease.

When employing wire brush material, plastic compounds such as those having a neoprene base may have their bond to such brush material improved by first applying a cement to the material, such cement preferably comprising a synthetic rubber and resin composition such as is commercially available under the name of "Ty-Ply-S" (Vanderbilt). The cement may be applied by spraying, dipping, or painting the previously thoroughly cleaned brush material. The brush should then be properly dried before intruding the plastic matrix material. An epoxy resin is also an excellent adhesive or bonding agent for application to the brush filaments.

*Fillers*

The plastic which is employed to embed the brush material substantially completely therein should not be so resistant to abrasion and wear that the ends of the brush bristles will not protrude therefrom. Thus, ordinary tire tread rubber containing certain selected carbon blacks is not suitable for the purpose as it is very resistant to abrasion and will not crumble or wear back at a rate appreciably greater than that of bristle material embedded therein. A buffing action is therefore obtained rather than the brushing or cutting action it is an object of this invention to provide. Moreover, it tends to smear the work.

Typical examples of suitable fillers include:

Finely crushed stone, such as limestone
Asbestine powder (asbestos gangue)
Kaolins
Clays, such as bentonite
Whiting
Various mixtures of the above Rubber and the various synthetic plastics which may be employed are commonly combined with several other ingredients, including fillers, in a manner well known in the art. In fact, the final plastic material may comprise a composition of which only about one-fifth is constituted by the original pure plastic, such as neoprene, for example. The degree of abrasion resistance of such final plastic material relative to that of the brush material may be controlled and modified as necessary by employment of the proper proportion of fillers. When cured, such final plastic material should display at least some degree of resilience and should neither be hard (like hard rubber) nor overly tough and abrasion resistant (like tire tread rubber).

*Abrasives*

It is often desired to apply abrasive to a work-piece in addition to the cutting or polishing action which may be produced by the brush material. In fact, brushes are often employed primarily as a means of applying powdered abrasive.

Wire brush material would be an excellent applicator of such powdered or granular abrasive except for the difficulty in inducing it to hold the same, even when the abrasive is supplied in the form of a paste to assist it in adhering to the wire strands. By incorporating the abrasive in the plastic employed in the "short trim" brushing tool above described, such abrasive is continuously supplied to the working face of the tool as the plastic crumbles away.

Typical examples of suitable abrasives for use in accordance with this invention include:

Aluminum oxide ("Alundum," "Aloxite")

Silicon carbide ("Carborundum," "Corundum")
Chrome oxide
Natural abrasives (e.g. pumice, emery)
Mixtures of the above A typical example of a plastic composition suitable for employment as the resilient body is as follows:

| | Parts |
|---|---|
| Neoprene [1] | 100 |
| ZnO | 5 |
| MgO | 5 |
| Anti-Oxidant | 2 |
| Rubber sub.[2] | 50 |
| Limestone filler | 250 |
| Clay filler | 100 |
| Softener [3] | 30 |
| Stearic acid | 1 |

[1] Both Hycar and neoprene are synthetic rubberlike materials.
[2] So-called "rubber substitutes" are commonly employed in compounding rubber and similar plastics, and may comprise blown oils.
[3] The softener was a petroleum distillation product. Waxes commonly used in the rubber industry may be employed for this purpose.

Another example of a plastic composition suitable for employment as the resilient body is as follows:

| | Percent by weight |
|---|---|
| Neoprene GN | 51.94 |
| Zinc oxide | 2.60 |
| ELC magnesia | 2.08 |
| Sodium acetate (retarder) | .26 |
| Unicel N.D. (blowing agent) | 1.56 |
| Mapico red (coloring material) | .52 |
| Zeolex (filler) | 16.62 |
| Paraffin (lubricant) | .52 |
| Circo Lite Foil (plasticizer) | 23.38 |
| Thermoflex A (anti-oxidant) | .52 |
| | 100.00 |

The elastomeric material composition such as that given above may be rolled out in strip or sheet form and a strip 5 of such material then laid upon a layer of brush material as diagrammatically illustrated in FIG. 1, described above.

The resulting composite brush element, either in the form of a straight length of brush strip or a turn or coil of such strip, is then placed in the appropriate mold adapted to retain the form of the brush during the curing period while the elastomeric material is expanding and intruding between the individual brush bristles 4. The mold affords the required resistance to movement of the brush material so that the elastomeric material can penetrate into the interstices between the bristles and completely fill the mold. Inasmuch as the molds are closed while the elastomeric material is cold, no substantial pressure is required to effect such closing. It is the expansion of the elastomeric material on heating that creates the pressure within the mold. Consequently, elaborate mold closing and operating mechanism is not required. The filled molds may be stacked in an oven and cured for different periods of time depending upon the size of the brush or brushes in the mold, the type of plastic composition employed, and the temperature of the mold at the start. If the mold is still quite warm from previous use, it may be refilled and returned to the oven for a shorter period of time than would be required for a cold mold. For compositions such as those given above and brush elements of ordinary size and type, the curing time may generally be from 1½ to 3 hours and the curing temperature about 300° F.

While sponging compositions of the general type indicated above are ordinarily preferred, other known elastomeric compositions may be utilized which tend to expand when heated and cured although not necesarily forming a true sponge. When the brush strip of FIG. 1 is to be circularized, as will generally be the case, the outer edge portions of the strip 5 of elastomeric material may be formed of somewhat greater thickness than the body of the strip to achieve a more uniform distribution of the elastomeric material when such edge portions are stretched during such circularization. When brush strip is helically wound to form a rotary brush, a helically wound strip of the elastomeric material may be interposed between the turns of the same prior to placing in the FIG. 2 mold, for example.

Other modes of applying the principle of the invention may be employed, change being made as regards the details described, provided the features stated in any of the following claims or the equivalent of such be employed.

I therefore particularly point out and distinctly claim as my invention:

1. The method of manufacturing a composite brushing tool which comprises stacking a plurality of annular brush sections on a spindle, such brush sections having inner annular hub portions with bristle material extending generally radially outwardly therefrom, co-extensive annular metal discs being interposed between adjacent brush sections, and annular discs of uncured elastomeric material placed against each side of each of such annular brush sections substantially co-extensive with the bristle material of the latter, the ends of such assembly comprising metal discs, securing the latter in definitely spaced relation effective axially to compress the remainder of such assembly therebetween, applying cylindrical shell elements to such assembly laterally thereof directly inwardly toward the outer ends of the bristles to avoid disturbing such bristle material, and heating such elastomeric material to soften and intrude the same between such bristles and then to cure such material.

2. The method of claim 1 wherein such uncured elastomeric material includes a blowing compound effective to produce gas during such heating and curing operation and thereby to produce a cured sponge elastomer.

3. The method of claim 1 wherein such uncured elastomeric material includes a blowing compound effective to produce gas during such heating and curing operation and thereby to produce a cured sponge elastomer, and such elastomeric material also includes filler material effective to make the cured composition more easily erodible than such bristles in use.

4. The method of claim 1 wherein such uncured elastomeric material is neoprene including a blowing compound effective to produce gas during such heating and curing operation and thereby to produce a cured sponge elastomer, and such elastomeric material also includes filler material effective to make the cured composition more easily erodible than such bristles in use.

5. The method of manufacturing a composite rotary brushing tool having a central hub, bristles extending generally radially outwardly therefrom, and a body of resiliently deformable elastomeric material interposed between such bristles to space the same; comprising disposing a layer of uncured elastomeric material laterally against the bristles of an annular rotary brush element having such bristles extending generally radially from a central annular support, mounting such brush element upon a central mandrel, securing end plates closely embracing such brush element and elastomer assembly, helically wrapping and securing a flat metal strip closely about the periphery of such assembly to complete the enclosure of the same, with the strip being thus applied substantially directly inwardly toward the bristle ends to avoid disarranging the latter, and heating such enclosed assembly to soften and intrude such elastomeric material between such bristles and to cure such material.

6. The method of claim 5 wherein such uncured elastomeric composition is of a character tending to expand when heated.

7. A mold for heating annular composite brush elements comprising a central mandrel, annular discs mounted thereon relatively movable toward and away from each other, one of said discs being thus mounted for removal from said mandrel, means releasably limiting relative movement apart of said discs, and a helically wound flat strip forming a continuous cylinder directly enclosing the space between said discs, said strip thereby being adapted to be wrapped about a cylindrical brush assembly without disarranging the bristle ends thereof and subsequently unwrapped therefrom.

8. The method of manufacturing a composite brushing tool which comprises applying a layer of uncured elastomeric material to a layer of bristles extending radially outwardly from a central region, applying a cylindrical shell to such assembly in a direction generally radially inwardly of such assembly to avoid disturbing such bristles, closing the ends of such shell and heating to soften and intrude such elastomeric material between such bristles and to cure such material.

9. The method of claim 8 wherein such shell engages the bristle ends when such shell has been brought into assembly in closed position to inhibit shifting of the bristle ends during such intrusion of such elastomeric material.

10. The method of claim 8 wherein such uncured elastomeric material includes a blowing compound effective to produce gas during such heating and curing operation and thereby to produce a cured cellular elastomer.

11. The method of manufacturing a composite brushing tool which comprises placing layers of uncured elastomeric material against substantially coextensive layers of bristles extending radially outwardly from a central region, compressing the resultant assembly axially thereof, securing such assembly in such compressed condition, applying a cylindrical shell laterally to such assembly closely enclosing the cylindrical brush face formed by the ends of such bristles in a direction generally inwardly toward such bristle ends without substantially disturbing the disposition of such bristles, and heating to soften and intrude such elastomeric material between such bristles and to cure such material.

References Cited in the file of this patent

UNITED STATES PATENTS

| | | |
|---|---|---|
| 1,163,525 | Gare | Dec. 7, 1915 |
| 1,713,027 | Cleaves | May 14, 1929 |
| 2,172,111 | Shick | Sept. 5, 1939 |
| 2,172,433 | Churchill | Sept. 12, 1939 |
| 2,190,206 | Churchill | Feb. 13, 1940 |
| 2,303,386 | Peterson | Dec. 1, 1942 |
| 2,406,732 | Hardman | Aug. 27, 1946 |
| 2,600,775 | Hurry et al. | June 17, 1952 |
| 2,604,362 | Sugarman et al. | July 22, 1952 |
| 2,634,167 | Bible | Apr. 7, 1953 |
| 2,648,084 | Swart | Aug. 11, 1953 |
| 2,740,148 | Nelson et al. | Apr. 3, 1956 |
| 2,783,095 | Ballard | Feb. 26, 1957 |